(12) United States Patent
Zuber et al.

(10) Patent No.: US 6,803,143 B2
(45) Date of Patent: Oct. 12, 2004

(54) GAS DIFFUSION STRUCTURES AND GAS DIFFUSION ELECTRODES FOR POLYMER ELECTROLYTE FUEL CELLS

(75) Inventors: Ralf Zuber, Grossostheim (DE); Armin Bayer, Freigericht (DE); Knut Fehl, Schlüchtern-Ramholz (DE); Volker Bänisch, Erlensee (DE); Thomas Lehmann, Langenselbold (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 270 days.

(21) Appl. No.: 09/844,677

(22) Filed: Apr. 30, 2001

(65) Prior Publication Data

US 2002/0041992 A1 Apr. 11, 2002

(30) Foreign Application Priority Data

Apr. 28, 2000 (EP) .............................. 00109276

(51) Int. Cl.[7] .............................. H01M 4/86
(52) U.S. Cl. .............................. 429/40; 429/41; 429/42; 429/44; 204/283; 204/290 R; 204/294; 204/296
(58) Field of Search .............................. 429/41, 40, 42, 429/44, 12, 46; 204/283, 290 R, 294, 296

(56) References Cited

U.S. PATENT DOCUMENTS

| 4,293,396 | A |   | 10/1981 | Allen et al. ............... 204/106 |
| 4,564,427 | A |   | 1/1986  | Gruver et al. |
| 4,636,274 | A |   | 1/1987  | Gruver et al. ............... 156/279 |
| 4,927,514 | A |   | 5/1990  | Solomon et al. ............ 204/290 |
| 5,441,823 | A |   | 8/1995  | Naimer et al. .............. 429/42 |
| 5,783,325 | A | * | 7/1998  | Cabasso et al. ............. 429/42 |
| 5,861,222 | A |   | 1/1999  | Fischer et al. .............. 429/42 |
| 5,998,057 | A | * | 12/1999 | Koschany et al. ........... 429/42 |
| 6,127,059 | A | * | 10/2000 | Kato ............................ 429/40 |
| 6,451,470 | B1| * | 9/2002  | Koschany et al. ........... 429/40 |

FOREIGN PATENT DOCUMENTS

| CA | 2052221       | 5/1992  |
| CA | 2052221       | 4/2000  |
| DE | 19544323      | 6/1997  |
| DE | 195 44 323    | 6/1997  |
| DE | 196 11 510    | 9/1997  |
| DE | 198 12 592    | 10/1999 |
| DE | 198 37 669    | 3/2000  |
| EP | 0 869 568     | 10/1998 |
| EP | 0 928 036     | 7/1999  |
| WO | WO 97/13287   | 4/1997  |
| WO | WO 99/56335   | 11/1999 |

OTHER PUBLICATIONS

European Search Report dated Sep. 6, 2000.

* cited by examiner

Primary Examiner—Bruce F. Bell
Assistant Examiner—M. Wills
(74) Attorney, Agent, or Firm—Kalow & Springut LLP

(57) ABSTRACT

A gas diffusion structure for polymer electrolyte fuel cells having a sheet-like carbon substrate made hydrophobic and having two main opposing surfaces and a contact layer on one of these surfaces. The contact layer is formed of an intimate mixture of at least one hydrophobic polymer, which can be polyethylene, polypropylene or polytetrafluoroethylene, and finely divided carbon particles, wherein the weight percentage of the carbon particles relative to the total weight of the contact layer amounts to 40 to 90 wt. %. The gas diffusion structure is a carbon substrate made hydrophobic by at least one hydrophobic polymer and the hydrophobic polymers are restricted to two layers extending from both opposing surfaces into the carbon substrate down to a depth of from 5 to 40 $\mu$m and the hydrophobic polymers fill of from 20 to 60% of the pore volume within those layers.

12 Claims, 2 Drawing Sheets

GAS DIFFUSION STRUCTURES AND GAS DIFFUSION ELECTRODES FOR POLYMER ELECTROLYTE FUEL CELLS

INTRODUCTION AND BACKGROUND

The present invention relates to gas diffusion structures and gas diffusion electrodes for fuel cells, in particular for PEM fuel cells in which a solid polymer is used as electrolyte.

Fuel cells convert a fuel and an oxidizing agent, spatially separated from each other, to electricity, heat and water at two electrodes. Hydrogen or a hydrogen-rich gas is used as the fuel and oxygen or air as the oxidizing agent. The process for energy conversion in the fuel cell is characterized by particularly high efficiency. For this reason, fuel cells in combination with electric motors are gaining increasing importance as an alternative to traditional internal combustion engines.

So-called polymer electrolyte fuel cells (PEM fuel cells) are suitable for use as energy converters in electric cars due to their compact structural design, their power density and their high efficiency.

PEM fuel cells consist of a stacked arrangement ("stack") of membrane electrode assemblies (MEA), between which are arranged bipolar plates to supply gas and conduct electricity. A membrane electrode assembly consists of a polymer electrolyte membrane which is provided with reaction layers on both faces, namely the electrodes. One of the reaction layers is designed as an anode for the oxidation of hydrogen and the second reaction layer is designed as a cathode for the reduction of oxygen. So-called gas diffusion structures made of carbon fiber paper or carbon fiber cloth which facilitate good access by the reaction gases to the electrodes and efficient conduction of the cell current are applied to the electrodes. The anodes and cathodes contain so-called electrocatalysts which catalytically support the relevant reaction (oxidation of hydrogen or reduction of oxygen). Metals from the platinum group in the periodic table of elements are preferably used as catalytically active components.

In most cases, so-called supported catalysts are used in which the catalytically active platinum group metals have been applied in a highly dispersed form on the surface of a conductive support material. The average crystallite size of the platinum group metals is between about 1 and 10 nm. Finely divided carbon blacks have proved to be suitable support materials.

The polymer electrolyte membrane consists of polymer materials which conduct protons. These materials are also called ionomers for short in the following. A tetrafluoroethylene/fluorovinylether copolymer with acid functions, in particular sulfonic acid groups is preferably used. Such a material is sold by E.I. DuPont under the tradename Nafion®. However, other, in particular fluorine-free, ionomer materials such as sulfonated polyether ketones or aryl ketones or polybenzimidazoles can also be used.

A further improvement in the electrochemical cell power and a clear reduction in the costs of the system are required for the wide commercial use of PEM fuel cells in motor vehicles.

An essential prerequisite for an increase in cell power is the optimal supply and removal of the particular reaction gas mixtures to and from the catalytically active centers in the catalyst layers. In addition to supplying hydrogen to the anodes, the ionomer material in the anodes must be constantly moistened with water vapour (moistening water) in order to ensure optimum proton conductivity. The water generated at the cathodes (reaction water) must be removed continuously in order to avoid flooding of the pore system in the cathodes and thus obstruction of the oxygen supply.

U.S. Pat. No. 4,293,396 describes a gas diffusion electrode which consists of an open-pore electrically conducting carbon cloth. A uniform mixture of catalytic carbon particles and hydrophobic binder particles is evenly deposited on said cloth, with said mixture of particles adhered within the cloth pores and to the yarns of the cloth. The hydrophobic binder particles are made from Teflon® (PTFE). According to an. article from Wilson, Valerio and Gottesfeld (Electrochimica Acta Vol. 40, No 3., pp. 355 to 363, 1995) the impregnation of a carbon cloth with a carbon black/PTFE mixture results in a porous body of which the majority of pores is on the scale of the carbon black particles, or in the neighbourhood of 10 nm. Thus, the pores of the gas diffusion electrodes of U.S. Pat. No. 4,293,296 are filled with a microporous material.

The U.S. Pat. No. 4,564,427 describes gas depolarized cathodes having hydrophobic barrier layers for circulation electrolyte electrochemical cells. The cathode consists of a porous carbonized fiber substrate having the barrier layer comprising fluorocarbon polymer and carbon deposited thereon and a catalytic layer on top of the barrier layer. The barrier layer has a mean pore diameter size of about 0.2 to about 0.4 $\mu$m. Thus, the barrier layer is a microporous layer, too.

German patent document DE 195 44 323 A1 discloses a gas diffusion electrode for polymer electrolyte fuel cells which contains a carbon fiber fleece which is coated with a mixture of a carbon black suspension and a polytetrafluoroethylene suspension and is then sintered.

In EP 0 869 568, a gas diffusion layer is described which consists of a carbon fiber woven cloth which has been provided with a coating of carbon black and a fluorinated polymer on the face turned towards the catalyst layer.

The gas diffusion electrodes and gas diffusion structures or layers described in U.S. Pat. No. 4,293,396, DE 195 44 323 A1 and EP 0 869 568 are strongly hydrophobic and are not flooded by moistening or reaction water. However, free access by the reactive mixture to the catalyst layer is clearly obstructed by filling the macropores in the entire layer with a microporous material made from carbon black and polytetrafluoroethylene (PTFE). This leads to low power values when operating with dilute gases such as air and reformate gas, in particular at low stoichiometry, that is at high gas utilization.

In Canadian patent application CA 2,052,221, a hydrophobic, porous and simultaneously electrically conductive material is described which consists of a porous and electrically conductive sheet-like material and a hydrophobic polymer which is introduced into the sheet-like material by impregnation. The proportion of polymer present is 2 to 14 wt. %. WO 97/13287 describes an electrochemical cell which contains a gas diffusion structure which consists of two layers, wherein the pores in the first layer are smaller than those in the second layer and the second layer has a porosity of at least 82% and an average pore size of at least 10 $\mu$m. Also described is a non-woven gas diffusion structure in which the second layer has a porosity of at least 50% and an average pore width of 35 $\mu$m. The pore size in the fine-pored layer is cited as 0.1 to 10 $\mu$m and its porosity as at least 10%.

The gas diffusion structures described in WO 97/13287, in particular when operating with moistened reactive gases at high current density, low reactive gas pressure and low stoichiometry, suffer from flooding of the gas diffusion structures with reaction or moistening water.

EP 0 928 036 A1 describes a carbon cloth based electrocatalytic gas diffusion electrode comprising on one or both of its surfaces one or more microporous layers manufactured from different mixtures of carbon black and PTFE.

WO 99/56335 describes a structure which is intended to facilitate the simultaneous transport of gases and liquids. It consists of a porous carbon fiber substrate which has 75–95% of hydrophobic pore volume and 5–25% hydrophilic pores. The two fractions are blended in one layer and are in direct contact. Here again, pores with a pore width greater than a few 10 μm are present which are flooded when there is a great deal of product water produced or with intense moistening. This leads in particular at high current density to gas transport problems.

U.S. Pat. Nos. 4,927,514 and 5,441,823 describe air cathodes and processes for their production. They consist of a porous support layer made of carbon and hydrophobic polymers which make contact with an active layer. These layers are combined with support structures made of thin metal netting and sintered. In U.S. Pat. No. 4,927,514, between the active layer and the support layer there is arranged a porous bonding layer consisting of a thermoplastic hydrophobic polymer. The disadvantage of the electrodes mentioned here is also the small proportion of open pores present in the support layer. This leads to low power values when operating with dilute gases such as air and reformate gas, in particular at low stoichiometry, that is high gas utilization. The metal netting structures used are also subject to corrosion under the operating conditions of PEM fuel cells.

Thus an object of the present invention is to improve gas diffusion structures and gas diffusion electrodes for polymer electrolyte fuel cells and to avoid the disadvantages in prior known production methods described in the prior art.

SUMMARY OF THE INVENTION

The above and other objects of the present invention can be achieved by a gas diffusion structure for polymer electrolyte fuel cells comprising a hydrophobic, sheet-like carbon substrate and having two main opposing surfaces and a contact layer on one of these surfaces. This contact layer comprises an intimate mixture of at least one hydrophobic polymer selected from the group consisting of polyethylene, polypropylene and polytetrafluoroethylene and finely divided carbon particles, wherein the weight percentage of the carbon particles relative to the total weight of the contact layer amounts to 40 to 90 wt. %. The gas diffusion structure is characterized in that the carbon substrate is made hydrophobic by at least one hydrophobic polymer and the hydrophobic polymers are restricted to two layers extending from both opposing surfaces into the carbon substrate down to a depth of from 5 to 40 μm and the hydrophobic polymers fill of from 20 to 60% of the pore volume within said layers.

According to the present invention the gas diffusion structure consists of four layers. The center part of the carbon substrate forms the first layer and is free of hydrophobic polymer. The gas diffusion structure further comprises two hydrophobic layers bounding the center layer on both sides. The two hydrophobic layers form an integral part of the carbon substrate. They penetrate the carbon substrate from its two opposing surfaces down to a certain depth. The contact layer is the fourth layer of the gas diffusion structure and is fixed on top of one the two hydrophobic layers.

The carbon substrate of the gas diffusion structure is preferably formed by a macroporous carbon fiber substrate with a layer thickness between 100 and 400 μm. The carbon fiber substrate may be woven or non-woven. Preferably carbon fiber paper or carbon fiber woven cloth are used. These substrates have a porosity ranging between 60 and 90% with average pore diameters of from 20 to 50 μm. Within the context of this invention porous materials with average pore diameters above 10 μm are designated as coarse-pore or macroporous materials and materials having average pore diameters below 10 μm are designated as fine-pore or microporous materials.

The two hydrophobic layers contain at least one hydrophobic polymer chosen from the group consisting of polyethylene, polypropylene and polytetrafluoroethylene. As an alternative to the hydrophobic polymers mentioned, other organic or inorganic hydrophobic materials may also be used. The thickness of the hydrophobic layers is 5 to 40 μm, preferably 10 to 20 μm. For certain applications, the thickness of the hydrophobic layers on the anode and cathode faces may be different. Thus, when operating the fuel cell system at approximately atmospheric pressure, it is advantageous to have a layer thickness of 10 to 25 μm on the anode side and of 5 to 15 μm on the cathode side.

The two hydrophobic layers are rendered hydrophobic by a hydrophobic polymer or a mixture of hydrophobic polymers. The hydrophobic polymer or the polymer mixture is introduced from the surfaces of the carbon support down to the desired depth in the pores of the support, wherein the hydrophobic polymer fills 20 to 60%, preferably 40 to 60%, of the pore volume of the carbon support in the region of the hydrophobic layers. In other words, the hydrophobic polymer or polymers occupy 20 to 60% of the pore volume of the layers. It is not necessary to add carbon fibers or carbon particles to the hydrophobic polymer because electrical conduction is sustained by the fibers of the carbon support. Due to the hydrophobic polymers the porosity of the hydrophobic layers is reduced while the average pore diameters remain nearly unchanged compared to the original substrate.

In the context of this invention, a contact layer is understood to be any layer in the gas diffusion structure which makes contact with the electrode layer in the fuel cell. The contact layer contains an intimate mixture of a hydrophobic polymer and finely divided carbon particles, wherein the proportion of carbon particles in the total weight of the contact layer is 40 to 90 wt. %. The same materials as those used for the hydrophobic layers may be used as hydrophobic materials for the contact layer. The thickness of the contact layer is between 5 and 100 μm.

The gas diffusion structure described herein may be used to produce gas diffusion electrodes and complete membrane electrode assemblies. To produce a gas diffusion electrode, an electrode layer which contains an electrocatalyst is applied to the contact layer on the gas diffusion structure. Such electrode layers are described, for example, in German patent applications DE 196 11 510 A1, DE 198 12 592 and DE 198 37 669. They mostly contain an ionomer and an electrocatalyst dispersed therein. An appropriate catalyst has to be used, depending on whether an anode or a cathode is going to be produced. The electrode layers described in the patent applications mentioned are also porous and have a porosity between 40 and 70%. The thickness is between 5 and 100 μm.

A complete membrane electrode assembly for a fuel cell contains a polymer electrolyte membrane with gas diffusion electrodes applied to both faces.

The gas diffusion structure and the gas diffusion electrodes and membrane electrode assemblies built up therefrom enable good access by the reactive gases to the catalytically active centers in the membrane electrode assembly, effective moistening of the ionomer in the catalyst layers and problem-free removal of the reaction product water away from the cathode faces of the membrane electrode assemblies.

The contact layer has a fine-pore structure with pore diameters of less than 10 µm. This ensures optimal transport of the reactive gases. The fine pores cannot be flooded with condensed water, which would hinder the transport of gases, due to their hydrophobic nature and their small pore diameter.

The two hydrophobic layers in the gas diffusion structure are particularly important. They prevent liquid water penetrating into the coarse-pore carbon support and flooding its pore system.

Commercially available, coarse-pore carbon fiber substrates may be used to produce gas diffusion structures according to the invention. There are a variety of substrate materials which differ in structure, method of production and properties. Examples of such materials are Toray paper, or the woven carbon material AvCarb 1071 HCB from Textron Inc.

To produce gas diffusion structures according to the invention, the upper and lower faces of the coarse-pore carbon fiber substrate are provided, in a first step, with hydrophobic layers. This may take place in a number of ways.

In preparing the two hydrophobic layers each opposing surface of the carbon support is coated with a paste of a powdered, hydrophobic polymer and a liquid phase and then dried. The liquid phase may be water or organic liquids or mixtures thereof. After the last drying process, a three-layered structure is obtained which is calcined in order to sinter and introduce the polymer down to the desired depth into the carbon support, that is, the structure is heated to a temperature higher than the melting point of the chosen polymer. This can be achieved when using PTFE, for example, by heating to a temperature higher than 330° C.

To coat the carbon support with the paste, a spreading procedure or some other method of application is suitable. After sintering the polymer, the contact layer is then applied to one of the two hydrophobic layers using an ink which contains a hydrophobic polymer and fine carbon particles and the thus treated carbon substrate is then dried and calcined again. Alternatively, the intermediate calcination step after the application of the two hydrophobic layers may be omitted. Calcination in this case is then restricted to the final calcination step after the application of the contact layer. But it is preferred to use both calcination steps because this ensures a good definition of the four layer structure according to the invention.

Another possibility for applying the hydrophobic layer is to contact the surface of the carbon support with coarse-pore thin films of hydrophobic polymer. The films are laid on both faces of the carbon support and then bonded to the carbon support by applying pressure and heat. A sufficiently hydrophobic layer with the desired porosity is produced by choosing suitable parameters. When using PTFE, this can be achieved by heating for a short time to a temperature above 330° C.

Furthermore, deliberate surface impregnation with solutions or dispersions of hydrophobic polymers may be performed. The impregnated carbon support is dried at 250° C. while allowing air free access to both surfaces of the support and with vigorous exchange of air. Drying in a circulating air drying cabinet at 60 to 220, preferably at 80 to 140° C. is particularly preferred. Both surfaces of the carbon fiber substrate must be accessible to the circulating air. This then results in fixing of the hydrophobic polymer in the vicinity of the two surfaces of the carbon fiber substrate, particularly within the first 20 µm of the two faces of the substrate.

The hydrophobic layers which can be produced using the process described extend from each surface of the carbon support downwards into the support to a certain depth and thus fill up some of its pores. By suitable choice of the process parameters (polymer material used, amount of polymer material applied, calcination temperature and time of calcination), the depth of penetration of the layers can be fixed at a value between 5 and 40 µm. Layer thicknesses between 10 and 20 µm are preferably chosen. From experience, the pores in the carbon support in the region of the hydrophobic layers are 20 to 60% filled with polymer when using the process described.

To produce the contact layer, an applicable dispersion of conductivity carbon black or graphite and hydrophobic polymers is prepared. The liquid phase in this dispersion may be, for example, a mixture of an organic solvent and water. Such a dispersion is also called an ink in the following description. Carbon blacks or graphites which are suitable for this purpose are, for example, Vulcan XC72 from Cabot or HSAG 300 from Timcal. Hydrophobic polymers which are suitable here are also polyethylene, polypropylene, polytetrafluoroethylene or other organic or inorganic, hydrophobic materials. Polytetrafluoroethylene or polypropylene have proved to be especially useful. The proportion of carbon in the ink is between 40 and 90 wt. %, with respect to the total weight of carbon and polymer, depending on the application. The rheological properties of the ink can be adjusted to the particular method of application by means of suitable additives.

After combining the components, the ink is homogenized. Known auxiliary equipment such as, for example, high-speed stirrers, ultrasound baths or triple-roll mills may be used for this.

The homogenized mixture can be applied to the three-layered structure described above by a number of methods. These include, for example, spraying, brushing, coating or printing.

The applied layer is dried at temperatures between 60 and 140, preferably between 80 and 120° C. In a further thermal treatment step, the layer is calcined in order to sinter the hydrophobic polymer contained in the layer and to burn out rheological additives and pore-producers. In the case of polytetrafluoroethylene, the sintering temperature is above 330° C. When using other hydrophobic polymers, the treatment temperatures have to be adjusted accordingly.

The contact layer has a thickness between 5 and 100, preferably between 10 and 30 µm. Below a thickness of 5 µm, the layer is irregular due to its porous structure. This results in reduced electrical conductivity. Above 60 µm, the gas transport is too slow due to the long diffusion path. Layer thicknesses between 10 and 30 µm have proven especially effective for the most frequently encountered applications.

BRIEF DESCRIPTION OF THE DRAWINGS

The present invention will be further understood with reference to the accompanying drawings, wherein.

DETAILED DESCRIPTION OF INVENTION

Examples 1–2 describe the production of gas diffusion structures according to the invention and membrane electrode assemblies produced therewith.

Figure 1:
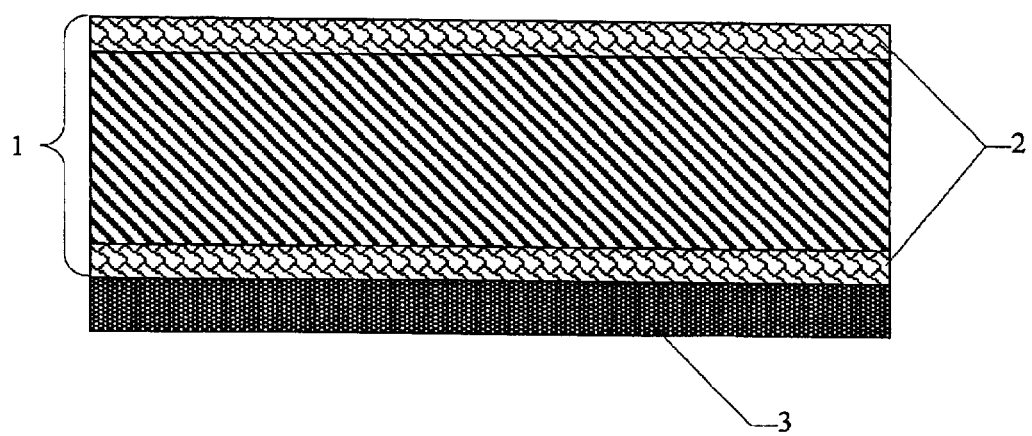
FIG. 1 is a schematic diagram of the gas diffusion structure according to the invention.

FIG. 1 shows a schematic cross-section through a gas diffusion structure (1) according to the invention. (1) denotes the sheet-like, coarse-pored carbon support. It has a hydrophobic layer (2) on each face. The layers (2) extend downwards into the carbon substrate from the respective surfaces to a desired depth. One of the two hydrophobic layers supports the contact layer (3).

Comparison Example 1 (CE1)

A fuel cell in accordance with CA 2,052,221 was produced. Carbon fiber paper with a porosity of 74.1% and a thickness of 200 μm (TGP-H-060 from Toray Inc., Japan) was immersed in an aqueous PTFE dispersion (Hostaflon TF 5032 from Dyneon, Gendorf). After 10 minutes the material was taken out of the dispersion. After draining off surplus dispersion from its surfaces, the carbon fiber paper was dried in air for 10 to 15 minutes. To melt the PTFE introduced into the structure, the impregnated carbon fiber paper was sintered on a hot steel plate for 10 to 15 seconds. The temperature of the plate was in the range 350 to 410° C.

By adjusting the PTFE concentrations in the dispersion, carbon fiber paper with a PTFE content of 9.3 wt. % for the anode of a fuel cell and of 4.5 wt. % for the cathode of a fuel cell were produced.

EXAMPLE 1

Anode gas diffusion structures and cathode gas diffusion structures in accordance with the present invention were manufactured and processed to form complete membrane electrode assemblies.

The base material used for the gas diffusion structures, as in comparison example 1, was carbon fiber paper with a porosity of 74.1% and a thickness of 200 μm (TGP-H-060 from Toray Inc., Japan). To apply the hydrophobic layers, 5 g of PTFE powder Hostaflon TF1740 (Dyneon Gendorf) with an average particle size of 25 μm was made into a thick paste with 1 g of Shellsol D70 (Shell Co.). The mixture was processed to give a paste-like material and was then applied to one surface of the carbon fiber paper with a doctor blade. Then the coated carbon fiber paper was dried at 100° C. in a circulating air drying cabinet. Then the other face was coated using the same procedure.

To melt the applied PTFE, the carbon fiber paper was sintered for about 15 minutes in a box kiln at 340 to 350° C. The carbon papers obtained in this way had a surface coating of 21.15 g PTFE/m2 after treatment. The carbon papers coated in this way were used in the following as substrates for anode gas diffusion structures.

To prepare substrates for cathode gas diffusion structures, the amount of Shellsol D70 was doubled to 2 g. Carbon fiber papers with a surface coating of 10.63 g PTFE/m2 were obtained in this way.

To apply the contact layers, inks in accordance with the following formulations were prepared:

TABLE 1

Ink 1 for the contact layer on the anode gas diffusion structure

| | |
|---|---|
| 12.88 g | Carbon black XC72 (Cabot Inc., USA) |
| 52.52 g | Dipropylene glycol |
| 25.16 g | 16.7% solution of Mowital B20H (Clariant, Kelsterbach) in dipropyleneglycol n-butyl ether |
| 9.08 g | Hostaflon TF5032 (Dyneon, Gendorf) |
| 0.36 g | Deionized water |

TABLE 2

Ink 2 for the contact layer on the cathode gas diffusion structure

| | |
|---|---|
| 12.65 g | Carbon black XC72 (Cabot Inc., USA) |
| 50.48 g | Dipropylene glycol |
| 24.37 g | 16.7% solution of Mowital B20H (Clariant, Kelster-bach) in dipropyleneglycol n-butyl ether |
| 2.95 g | Polyethylene oxide M = 300000 (Aldrich, Karlsruhe) |
| 9.22 g | Hostaflon TF5032 (Dyneon, Gendorf) |
| 0.32 g | Deionized water |

The constituents for the particular ink in accordance with the formulations given above were weighed into a porcelain dish and predispersed with a blade stirrer. A triple-roll mill was used to homogenize the mixture. The viscosities of the inks were measured with a Haake rotation viscometer RV20 at 100 s−1.

TABLE 3

Properties of the final inks

| | Ink 1 | Ink 2 |
|---|---|---|
| Viscosity at 100/s [Pa s] | 1.1 | 10.5 |
| Dry residue [wt. %] | 22.5 | 25.2 |

The inks described above for anode and cathode structures were applied in a screen printing process to one of the two hydrophobic layers on the carbon fiber papers and then dried at 100° C. The coated area was 50 cm². This process was repeated until the structure of carbon fiber paper had been covered.

Then the gas diffusion structures were treated for one hour in a muffle furnace at 390° C. The weight of the applied contact layer decreased by 18.5% in the case of the anode gas diffusion structures and by 28.5% in the case of the cathode gas diffusion structures. The surface loading of the calcined contact layer on the substrates was 2.5 mg/cm². The thickness of the layer was 15 to 20 μm.

Photographs of the gas diffusion structures taken under a microscope showed that a hydrophobic layer which contained PTFE as the main constituent was located on both faces of the carbon substrate. The thickness of this layer was 12 to 15 μm in the case of the anode gas diffusion structure and 5 to 10 μm in the case of the cathode gas diffusion structure. In accordance with these layer thicknesses, the proportion of PTFE in the hydrophobic layer is calculated as 54–58 wt. %, based on the weight per unit area and the PTFE loading on the carbon fiber substrate. The hydrophobic layers also contain a proportion of fibrous carbon stemming from the carbon substrate. The fibrous carbon ensures electrical contact and sufficient pores to permit the transport of gas. In accordance with the surface loading of PTFE, the thickness of layer determined and the density of PTFE (2.0 g/cm³), the hydrophobic layers have a residual porosity of about 53% of the original pore volume.

EXAMPLE 2

In a second set of trials, the hydrophobic layers were incorporated in the carbon support by an alternative process. Instead of coating the carbon support with a paste of a hydrophobic polymer, PTFE films were laid on the surfaces of the carbon support.

Again the carbon support used was the carbon fiber paper used in example 1 with a porosity of 74.1% and a thickness of 200 µm (TGP-H-060 from Toray Inc., Japan). A 0.030 mm thick film of porous ePTFE (density: 0.38 g/cm$^3$, TETRATEX from W. L. Gore & Associates) was laid on each face and the entire multilayered structure was fastened between two stainless steel plates (thickness 1 mm). The package prepared in this way was sintered for about 15 minutes at 340 to 350° C. in a box kiln. Then the stainless steel plates were removed. The carbon fiber papers obtained in this way had a surface loading of 17 g PTFE/m$^2$ after treatment. These carbon fiber papers were used in the following as substrates for anode gas diffusion structures.

The same trial was repeated with two ePTFE films with a thickness of 0.015 mm (density: 0.38 g/cm$^3$, TETRATEX from W. L. Gore & Associates). Carbon fiber papers with a surface loading of 9.3 g PTFE/m$^2$ were obtained in this way.. These carbon fiber papers were used in the following as substrates for cathode gas diffusion structures.

The inks for contact layers on the anode and cathode gas diffusion structures described in example 1 were applied in a screen printing process to the carbon fiber papers provided with hydrophobic layers and then dried at 100° C. The coated area was 50 cm$^2$. This process was repeated until the structure of carbon fiber paper had been covered.

Then the gas diffusion structures were treated for one hour at 390° C. in a muffle furnace. The weight of the applied contact layer decreased by 18.5% in the case of the anode gas diffusion structures and by 28.5% in the case of the cathode gas diffusion structures. The loading of calcined contact layer on the substrates was 2.5 mg/cm$^2$. The thickness of the layer was 15 to 20 µm.

Photographs of the gas diffusion structures taken under a microscope showed that a hydrophobic layer which contained PTFE as the main constituent was located on both faces of the carbon substrate. The thickness of this layer was 10 to 15 µm in the case of the anode gas diffusion structure and 5 to 8 µm in the case of the cathode gas diffusion structure. In accordance with these layer thicknesses, the proportion of PTFE in the hydrophobic layer can be calculated as 58 wt. %, based on the weight per unit area and the PTFE loading on the carbon fiber substrate. The hydrophobic layers also contain a proportion of fibrous carbon stemming from the carbon substrate. The fibrous carbon ensures electrical contact and sufficient pores to permit the transport of gas. In accordance with the surface loading of PTFE, the thickness of layer determined and the density of PTFE (2.0 g/cm$^3$), the hydrophobic layers have a residual porosity of about 54 to 58% of the original pore volume.

Electrochemical Tests

The anode and cathode gas diffusion structures produced in comparison example 1, and examples 1 and 2, together with a membrane coated with catalyst which had been produced in accordance with the instructions in U.S. Pat. No. 5,861,222 comparison example 1, were incorporated into a fuel cell test cell with an active cell area of 50 cm$^2$. The catalyst loading of the membrane electrode assembly and other technical data are given in the following table:

TABLE 5

| | |
|---|---|
| Membrane | Nafion 112 |
| Anode catalyst | 40% PtRu (1:1) on Vulcan XC72 |
| Pt-loading (anode) | 0.3 mg/cm2 |
| Cathode catalyst | 40% Pt on Vulcan XC72 |
| Pt-loading (cathode) | 0.4 mg/cm2 |

For the electrochemical performance test, a fuel gas mixture of 45 vol. % $H_2$, 31 vol. % $N_2$, 21 vol. % $CO_2$, 50 ppm CO with an airbleed of 3% air was used as anode gas. This fuel gas mixture simulates a reformate gas which can be obtained by steam reforming of hydrocarbons and subsequent purification steps for lowering the carbon monoxide content of the reformate. Air was used as cathode gas. The cell temperature was 75° C. The pressure of the working gases was 1 bar (absolute). The stoichiometry of the gases was 1.1 (anode gas) and 2.0 (cathode gas).

Figure 2:
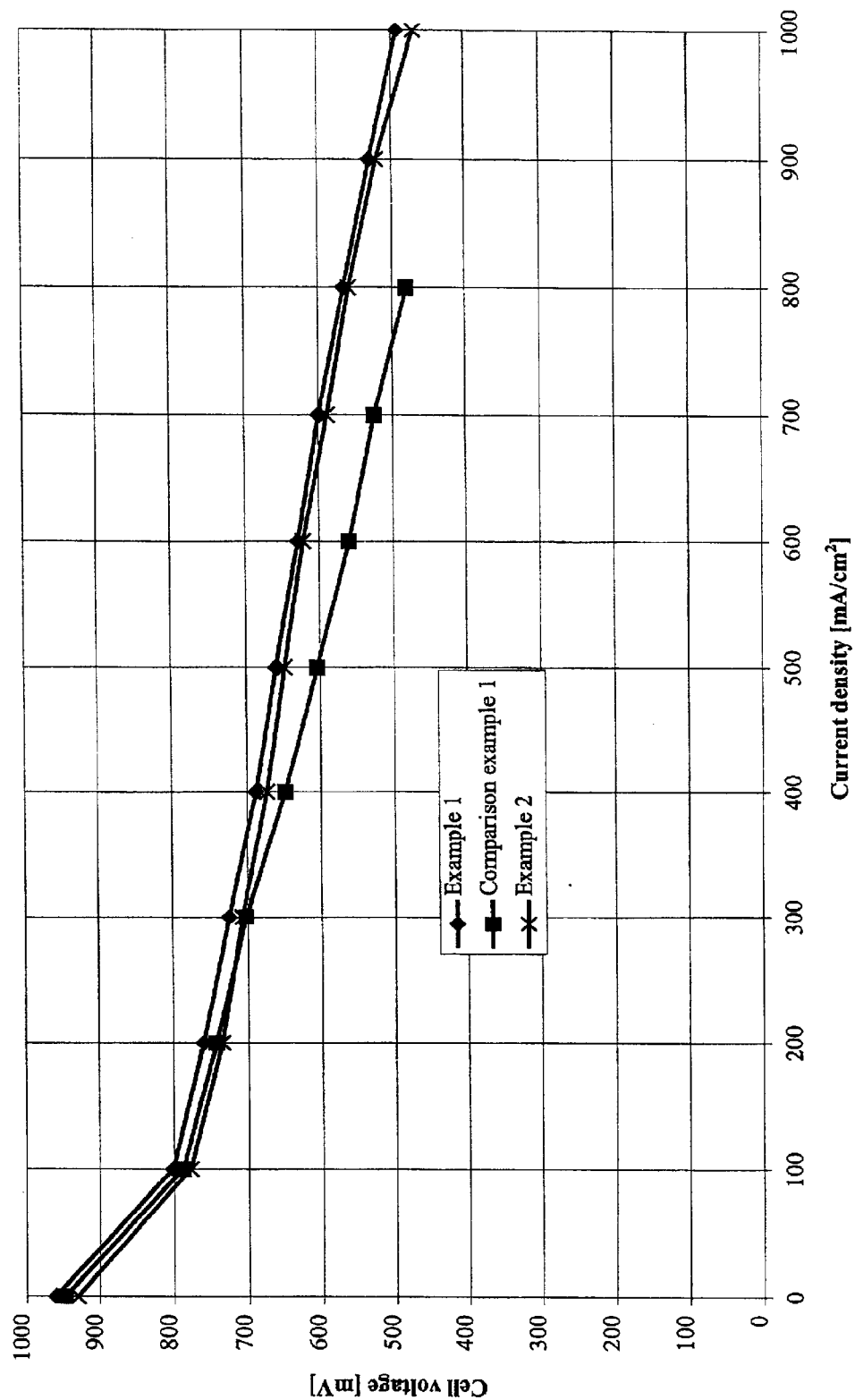
FIG. 2 is a graph of a plot of cell voltage against current density under air operation for the MEAs from example 1, example 2 and comparison example 1 (CE 1)

The cell voltages, measured when operating with air, against the current density are given in FIG. 2 for the cells from comparison example 1 and examples 1 and 2. It can be seen that the membrane electrode assemblies with gas diffusion structures in accordance with the invention provide clearly improved electrical power output as compared with the prior art (comparison example 1).

Table 6 shows the cell voltages measured when subjecting the cells to a current density of 600 mA/cm$^2$.

TABLE 6

Cell voltages under reformate/air operation at 600 mA/cm$^2$

| Example | Cell voltage [mV] |
|---|---|
| Comparison example 1 | 560 |
| Example 1 | 629 |
| Example 2 | 622 |

Further variations and modifications of the foregoing will be apparent to those skilled in the art and are intended to be encompassed by the claims appended hereto. European priority application 00 109 276.6 is relied on and incorporated herein by reference.

We claim:

1. A gas diffusion structure for polymer electrolyte fuel cells comprising a hydrophobic, sheet-like carbon substrate and having two main opposing surfaces and a contact layer on one of these surfaces, said contact layer comprising an intimate mixture of at least one hydrophobic polymer selected from the group consisting of polyethylene, polypropylene and polytetrafluoroethylene and finely divided carbon particles, wherein the weight percentage of the carbon particles relative to the total weight of the contact layer amounts to 40 to 90 wt. %, wherein said carbon substrate is made hydrophobic by at least one hydrophobic polymer and the hydrophobic polymer is restricted to two layers extending from said two main opposing surfaces of said carbon substrate into said carbon substrate down to a depth of from 5 to 40 µm, said carbon substrate having a measureable pore volume, and the hydrophobic polymer filling from 20 to 60% of the pore volume within said two layers.

2. The gas diffusion structure according to claim 1, wherein said two layers contain at least one hydrophobic polymer selected from the group consisting of polyethylene, polypropylene and polytetrafluoroethylene.

3. The gas diffusion structure according to claim 1, wherein said carbon substrate has a thickness of from 100 to 400 µm.

4. The gas diffusion structure according to claim 2, wherein said carbon substrate has a thickness of from 100 to 400 μm.

5. The gas diffusion structure according to claim 1, wherein said contact layer has a thickness of 5 to 100 μm.

6. The gas diffusion structure according to claim 2, wherein said contact layer has a thickness of 5 to 100 μm.

7. A gas diffusion electrode for fuel cells comprising a gas diffusion structure and an electrode layer, wherein said gas diffusion structure is the gas diffusion structure according to claim 1 and the electrode layer is applied to the contact layer of the gas diffusion structure.

8. A membrane electrode assembly for fuel cells comprising a polymer electrolyte membrane and gas diffusion electrodes applied to both faces thereof, wherein the membrane electrode assembly contains at least one gas diffusion electrode according to claim 7.

9. A polymer electrolyte fuel cell, comprising a membrane electrode assembly according to claim 8.

10. A process for producing a gas diffusion structure according to claim 1, comprising preparing the two hydrophobic layers by coating each opposing surface of the carbon support with a paste of a powdered, hydrophobic polymer and a liquid phase and then drying the resulting three-layer structure, calcining said three-layer structure to sinter the hydrophobic polymer and thereafter applying the contact layer to one of the two hydrophobic layers by using an ink which contains a hydrophobic polymer and fine carbon particles and then drying the thus treated carbon substrate, followed by calcining.

11. A process for producing a gas diffusion structure according to claim 1, comprising preparing the two hydrophobic layers by laying a thin film of a hydrophobic polymer on each of the two opposing surfaces of the carbon support, bonding said layer to the carbon support by applying pressure and heat and thereafter applying the contact layer to one of the two hydrophobic layers by using an ink which contains a hydrophobic polymer and fine carbon particles, drying the thus treated carbon substrate and then calcining.

12. A process for producing a gas diffusion structure according to claim 1, comprising preparing the two hydrophobic layers by impregnating the carbon support with a dispersion containing a hydrophobic polymer, and then drying with free access by air to the two opposing surfaces, and then calcining to sinter the polymer and thereafter applying the contact layer to one of the two hydrophobic layers by using an ink which contains a hydrophobic polymer and fine carbon particles, and then drying said carbon substrate and calcining.

* * * * *